United States Patent
Boreczky et al.

(10) Patent No.: US 6,366,296 B1
(45) Date of Patent: Apr. 2, 2002

(54) MEDIA BROWSER USING MULTIMODAL ANALYSIS

(75) Inventors: John S. Boreczky, San Leandro; Andreas Girgensohn; Jonathan T. Foote, both of Menlo Park, all of CA (US)

(73) Assignees: Xerox Corporation, Stamford, CT (US); Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/151,285

(22) Filed: Sep. 11, 1998

(51) Int. Cl.[7] .............................. G06F 3/00; G06F 3/14; G06F 17/30

(52) U.S. Cl. .................. 345/719; 345/716; 345/721; 345/968; 707/104.1

(58) Field of Search .................. 345/302, 326–327, 345/339, 968; 707/3–4, 6, 104

(56) References Cited

U.S. PATENT DOCUMENTS

| | | | |
|---|---|---|---|
| 5,136,655 A | | 8/1992 | Bronson ..................... 704/270 |
| 5,493,677 A | * | 2/1996 | Balogh et al. .............. 707/104 |
| 5,579,471 A | * | 11/1996 | Barber et al. ............... 345/326 |
| 5,655,058 A | | 8/1997 | Balasubramanian et al. ..... 704/255 |
| 5,664,227 A | | 9/1997 | Mauldin et al. ............ 707/516 |
| 5,708,767 A | | 1/1998 | Yeo et al. .................. 345/440 |
| 5,729,471 A | * | 3/1998 | Jain et al. .................. 345/419 |
| 5,893,110 A | * | 4/1999 | Weber et al. ............... 707/104 |
| 5,987,459 A | * | 11/1999 | Swanson et al. ............ 707/6 |
| 6,055,543 A | * | 4/2000 | Christensen et al. ........ 707/104 |

OTHER PUBLICATIONS

"Fully–Digital GML–Based Authoring and Delivery System for Hypermedia," IBM Technical Disclosure Bulletin, vol. 35, No. 2, p. 458–463, Jul. 1992.*

Ulrich Thiel, "Multimedia management and query processing issues in distributed digital libraries: a HERMES perspective," IEEE, p. 84–89, Jul. 1992.*

M.G. Christal, M.A. Smith, C.R. Taylor, and D.B. Winkler, Evolving Video Skims into Useful Multimedia Abstraction,: in Human Factors in Computing Systems, CHI 94 Conference Proceedings (Los Angeles, CA), New York: ACM, pp. 171–178, 1998.

A. Hampapur, A. Gupta, B. Horowitz, C.–F. Shu, C. Fuller, J. Bach, M. Gorkani, R. Jain, "Virage Video Engine," in Storage and Retrieval for Still Image and Video Databases V, Proc. SPIE 3022 (San Jose, CA), pp. 188–197, 1997.

A.G. Hauptmann, M.J. Witbrock, A.I. Rudnicky, S. Reed, "Speech for Multimedia Information Retrieval," in Proceedings of the ACM Symposium on User Interface Software and Technology, UIST'95 (Pittsburgh, PA), New York: ACM, pp. 79–80, 1995.

T. Shimizu, S.W. Smoliar, J. Boreczky, "AESOP: An Outline–Oriented Authoring System," In 31$^{st}$ Annual HICSS Conference, vol. 2, pp. 207–215, Jan. 1998.

(List continued on next page.)

Primary Examiner—Raymond J. Bayerl
Assistant Examiner—X. L. Bautista
(74) Attorney, Agent, or Firm—Oliff & Berridge, PLC.

(57) ABSTRACT

A media browser, graphical user interface and method for browsing a media file wherein a user selects at least one feature in a media file and is provided with information regarding the existence of the selected feature in the media file. Based on the information, the user can identify and playback portions of interest in a media file. Features in a media file, such as a speaker's identity, applause, silence, motion, or video cuts, are preferably automatically time-wise evaluated in the media file using known methods. Metadata generated based on the time-wise feature evaluation are preferably mapped to confidence score values that represent a probability of a corresponding feature's existence in the media file. Confidence score information is preferably presented graphically to a user as part of a graphical user interface, and is used to interactively browse the media file.

16 Claims, 10 Drawing Sheets

OTHER PUBLICATIONS

Y. Tonomura, A. Akutsu, K. Otsuji, T. Sadakata, "Video-MAP and VideoSpaceIcon: Tools for Anatomizing Video Content," In Proc. ACM Interchi '93, pp. 131–141, 1993.

M.M. Yeung, B.L. Yeo, W. Wolf and B. Liu, "Video Browsing using Clustering and Scene Transitions on Compressed Sequences", in *SPIE* vol. 2417 Multimedia Computing and Networking 1995, pp. 399–413, 1995.

F. Arman, R. Depommier, A. Hsu, M.–Y. Chiu, "Content–based Browsing of Video Sequences," *Proc. ACM Multimedia 94,* San Francisco, Oct. 1994, pp. 97–103.

M.A. Hearst, "TileBars: Visualization of Term Distribution Information in Full Text Information Access." In *Proc. ACM SIGCHI,* pp. 59–66, May, 1995.

M. G. Brown, J. T. Foote, G. J. F. jones, K. Spärk Jones and S. J. Young, "Automatic Content–Based Retrieval of Broadcast News." *In Proc. ACM Multimedia 95,* pp. 35–43, San Francisco, Nov. 1995.

J. T. Foote, "An Overview of Audio Information Retrieval" *ACM–Springer Multimedia Systems,* in press.

L. Wilcox, F. Chen and V. Balasubramanian. "Segmentation of Speech Using Speaker Identification." *In Proc. ICASSP 94,* vol. S1, pp. 161–164, Apr. 1994.

B. Arons. SpeechSkimmer: "A System for Interactively Skimming Recorded Speech". *ACM Trans On Computer Human Interaction,* vol. 4, No. 1, pp. 3–38, Mar. 1997.

S. Pfeiffer, S. Fischer and W. Effelsberg. "Automatic Audio Content Analysis." *Proc. ACM Multimedia 96,* Boston, MA, Nov., 1996, pp. 21–30.

J. T. Foote, "Rapid Speaker Identification Using Discrete MMI Feature Quantisation," *Expert Systems with Applications,* (1998) vol. 13, No. 4, pp. 283–289.

J. Boreczky and L. Wilcox, "A Hidden Markov Model Framework for Video Segmentation using Audio and Image Features." *Proc. ICASSP '98,* in press.

Arman, F., Hsu, A., Chiu, M–Y., "Image Processing on Ecoded Video Sequences," *Multimedia Systems* (1994), vol. 1, No. 5, pp. 211–219.

Boreczky, J. and Rowe, L., "Comparison on Video Shot Boundary Detection Techniques," Proc. SPIE Conference on Storage and Retrieval for Still Image and Video Databases IV, San Jose, CA, Feb., 1996, pp. 170–179.

Kasturi, R., Jain, R., "Dynamic Vision," in *Computer Vision: Principles,* Katsuri R., Jain R., Editors, IEEE Computer Society Press, Washington, 1991.

Zabih, R., Miller, J., Mai, K., "A Feature–based Algorithm for Detecting and Classifying Scene Breaks," *Proc. ACM Multimedia 95,* San Francisco, CA Nov. 1995, pp. 189–200.

Zhang, H. J., Kankanhalli, A., Smoliar, S. W., "Automatic Partitioning of Full–motion Video," *Multimedia Systems* (1993) vol. 1, No. 1, pp. 10–28.

Heckerman, D., "A Tutorial on Learning with Bayesian Networks," Microsoft Technical Report MSR–TR–96–06, Mar. 1995.

Shahraray, B. et al., "Automated Authoring of Hypermedia Documents of Video Programs," Multimedia 95, San Francisco, CA, 1995, pp. 401–409.

\* cited by examiner

ND VCR-type" playback control options, like play, stop, rewind, and fast forward. As anyone who has tried to find a specific video clip on a conventional video tape using a standard VCR will understand, it is often difficult to locate portions of interest in a video using the standard playback controls.

MEDIA BROWSER USING MULTIMODAL ANALYSIS

BACKGROUND OF THE INVENTION

1. Field of Invention

This invention relates to a method and apparatus for reviewing an aural and/or visual and/or other representation of a media file. Specifically, the invention relates to using media content features to allow a user to more easily review a media file.

2. Description of Related Art

Text documents often have many cues, such as headings, paragraphs, punctuation, etc., that allow a reader to quickly determine the beginning and end of different sections of the document and to aid the reader in finding areas of interest. However, video and audio browsing systems typically do not provide information to the user regarding simple features, like section beginning and end points, much less more complicated information, like the name of the speaker on a video clip. Such browsing systems typically offer only standard "VCR-type" playback control options, like play, stop, rewind, and fast forward. As anyone who has tried to find a specific video clip on a conventional video tape using a standard VCR will understand, it is often difficult to locate portions of interest in a video using the standard playback controls.

Many techniques exist for extracting information that represents the feature content of a media file. In this application, the term media or media file is used to represent any data stream that contains information regarding video or other image information, audio information, text information and/or other information. A feature of a media file is a property of the video, audio and/or text information in the media file, such as video or audio format, or information relating to the content of the media file, such as the identity of a speaker depicted in a video sequence, occurrences of applause, video shot boundaries, or motion depicted in a video sequence. For example, Pfeiffer et al., "Automatic Audio Content Analysis" ACM MULTIMEDIA 96, Boston, MA, 1996, pp. 21–30; Wilcox, et al., "Segmentation of Speech Using Speaker Identification", Proc. ICASSP 94, vol. S1, Apr. 1994, pp. 161–164; and Foote, "Rapid Speaker ID Using Discrete MMI Feature Quantisation," Expert Systems with Applications, vol. 13, no. 4, 1997, pp. 293–289, describe various methods for identifying audio features, such as music, human speech, and speaker identity. Regarding video data, Boreczky et al., "Comparison of Video Shot Boundary Detection Techniques" Proc. SPIE Conf. On Storage and Retrieval for Still Image and Video Databases IV, San Jose, CA, vol. 2670, Feb. 1996, pages 170–179, and Zhang et al., "Automatic Partitioning of Full-motion Video", Multimedia Systems, vol. 1, no. 1, 1993, pp. 10–28, disclose methods for identifying shot boundaries (radical changes in video content) and motion. As described in these and other similar references, features in a media file can be identified automatically using any of a number of different techniques.

SUMMARY OF THE INVENTION

Providing feature information in a media browsing system can be very useful for a user when identifying areas of interest in a media file, controlling media playback, editing a media file, or performing other operations with a media file. For example, graphically identifying areas in a media file where a particular speaker is shown on a video clip can allow a user to quickly determine and playback those portions that contain the speaker.

Providing feature information to the user based on automatically identified features also eliminates the need for a user to manually index or otherwise mark significant portions of the media file for later retrieval. Thus, the invention can use existing methods for automatically identifying features in a media file to generate and provide feature information to a user to aid the user in browsing the media file.

The invention provides a media browser that uses media feature information as an aid in navigating, selecting, editing, and/or annotating a media file.

In one aspect of the invention, media features are selected by a user.

In one aspect of the invention, media browsing functions, such as play, rewind, stop, fast-forward, index, automatic slide show, and automatic preview, are controlled based on feature information.

In one aspect of the invention, feature information for a selected feature is mapped to a corresponding confidence score.

In one aspect of the invention, the media browser includes a feature indicator that provides information related to a corresponding selected feature based on a corresponding confidence score.

In one aspect of the invention, a feature indicator combines at least two confidence scores and provides information based on the combination.

In one aspect of the invention, a feature indicator provides information related to a confidence score based on a value of another confidence score.

The invention also provides a method for browsing a media file. A feature of the media file being browsed is selected and information related to a confidence score for at least one selected feature is provided. The confidence score relates to the existence of a corresponding selected feature in the media file. Based on the information related to the confidence score, a portion of the media file is selected.

In one aspect of the invention, a metadata value representing a time-wise evaluation of a feature in the media file is mapped to a corresponding confidence score.

In one aspect of the invention, mapping of a metadata value to a corresponding confidence score is non-linear.

In one aspect of the invention, mapping of a metadata value to a confidence score is dependent on a user-defined control value or values.

BRIEF DESCRIPTION OF THE DRAWINGS

The invention will be described in relation to the following drawings in which reference numerals refer to like elements, and wherein.

DETAILED DESCRIPTION OF PREFERRED EMBODIMENTS

The invention is described in connection with browsing a media file. As used herein, browsing refers to any operation related to reviewing, manipulating, editing, selecting portions of, storing, transmitting, or other operations related to a media file. In addition, a preferred embodiment of a graphical user interface for a media browser is described below having specific functions. In many cases, various functions of the media browser can be eliminated or altered, as desired. For example, information that is displayed graphically in the embodiment described below can be provided aurally or otherwise, as described more fully below.

As discussed above, several methods exist for automatically deriving information that represents the likelihood of the existence of a feature in a media data stream. Such information, called metadata, can be very useful and provides cues for locating portions of interest in a media file. For example, automatic methods exist for identifying silent portions in audio data. Identifying such portions can be useful in editing the audio data because, if silent portions are identified, an edit region of the audio data can be bounded by the silent portions, thereby insuring that speech in the edit region is not cut mid-word or mid-sentence.

As another example, a common video analysis technique is the detection of shot boundaries, which represent significant differences between consecutive video frames. As is well known, the difference between consecutive video frames can be determined based on statistical properties of the pixels in the frame images, histogram differences, compression algorithms, edge differences, or motion detection. Application of one of several known techniques for detecting shot boundaries results in a series of time-varying metadata values that each represent a difference between consecutive video frames. Once metadata regarding the shot boundary feature is determined, information can be provided to a user to aid the user in locating portions of interest in the media file, e.g., places in the media file where scene changes occur.

Although metadata can be automatically generated, metadata can be input by a user or group of users. For example, a user could review a media file and identify sections of the media file where a particular speaker is featured, e.g., the speaker is either shown visually or is speaking. After identifying portions of the media file where a speaker is featured, the user can manually enter metadata that indicates the user's subjective evaluation of whether the speaker is present in the media file at each time-wise position in the media file. The user can enter the metadata continuously after viewing each video frame or listening to each predefined sub-portion of the media file. Alternately, the user could identify onoy those portions of the media file where the speaker is featured, and all other portions of the media file could be assigned metadata values that indicate that the speaker is not present in the media file.

Figure 1:
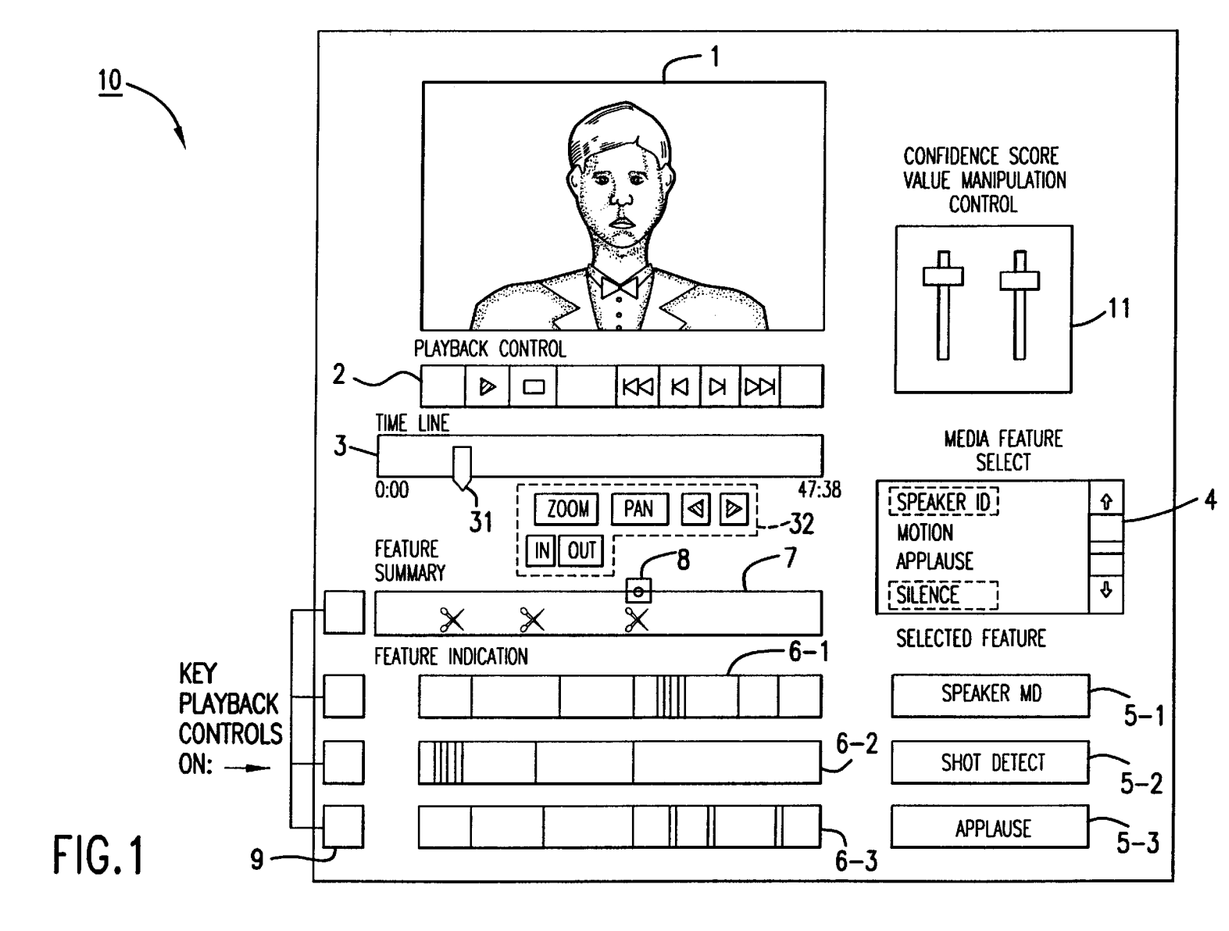
FIG. 1 is an example screen display for a graphical user interface in accordance with the invention.

FIG. 1 shows an example graphical user interface 10 in accordance with the invention. The graphical user interface 10 is typically displayed on a video display, such as a computer monitor, but can be presented to a user on any other display device. The interface 10 has a video display portion 1 in which a still video frame representation of an image contained in a media file can be presented. Video frames can also be displayed at any desired video frame rate, such as that performed on a standard computer monitor or television set. Audio representations of sound information contained in a media file can be presented to a user by a speaker (not shown). Alternately, visual representations of sound information, such as a waveform, can be presented on the graphical user interface 10.

A playback control bar 2 contains playback controls that are used to control how a visual and/or aural representation of a media file is presented to a user. For example, the playback control bar 2 can include buttons for controls such as play, stop, rewind, fast forward, and forward and reverse index. The playback controls shown in FIG. 1 are not intended to be an exhaustive representation of all of the different types of playback controls that can be provided. For example, controls can be provided to alter the effective frame rate at which a video display is generated or the speed at which a sound representation is played back. As with other features of the interface 10, a user activates controls on the playback control bar 2 by clicking a desired button with a mouse cursor. Other methods for activating the controls can be used, such as individual keystrokes or combinations of keystrokes on a keyboard, selection of controls using a touch screen or light pen, or other selection device.

A timeline 3 includes a thumb 31 that indicates a current time-wise position in the media file. The timeline 3 shown in FIG. 1 ranges from time 0:00 to time 47:38 and can be optionally zoomed in or out and panned using the timeline controls 32.

The thumb 31 can be moved time-wise along the timeline 3 by using the left and right timeline controls 32. Alternately, a user could select the thumb 31 using a mouse and move the thumb 31 to a desired position along the timeline 3 using the mouse. By moving the thumb 31 time-wise along the timeline 3, a corresponding video and/or aural representation of the media file located at the time-wise position of the thumb 31 can be played back. For example, video frames or preselected keyframes at corresponding time-wise locations in the media file can be displayed in the video display portion 1 as the thumb 31 is moved. Alternately, video/aural playback could begin from a corresponding position in the media file after the thumb 31 is moved to a desired position and released.

A user can select a feature in the media file using a media feature selection 4. The feature selection 4 includes a scroll bar for navigating through a list of selectable features. Preferably, features in the feature selection 4 are selected by double clicking a desired feature with a mouse cursor. Alternately, a user could type in a selected feature using a keyboard or otherwise enter a selected feature, such as by speaking a selected feature, which is recognized by the browsing system using voice recognition techniques. Preferably, the features listed in the feature selection 4 are organized in alphabetical order or otherwise grouped logically. For example, video-related features are preferably grouped apart from audio-related features.

Selected features are displayed in selected feature windows 5. In the example graphical user interface 10 of FIG. 1, three selected feature windows 5-1, 5-2, and 5-3 are shown. However, fewer or more selected feature windows 5 could be used. Corresponding to each selected feature window 5 is a feature indication window 6. The feature indication window 6 preferably graphically indicates the time-wise presence or absence of a corresponding feature in the media file, but the feature indication window 6 could display other information related to the corresponding feature. For example, the feature indication window 6-3 graphically displays the time-wise presence of applause in the media file. In this example, solid vertical lines displayed in a feature indication window 6 indicate a determination that the corresponding feature is likely present in the media file at the corresponding timewise location in the media file. However, other representations are possible, as discussed more fully below.

A feature summary bar 7 preferably graphically displays a summary of the selected features. In this example, the feature summary bar 7 includes graphical icons 8 that each indicate, or represent, specific information. For example, the scissors icon 8 indicates the presence of a cut or shot detect in the media file. The icons 8 can also indicate information related to two or more features. For example, a rectangular icon 8 containing a circle indicates a portion of the media file that contains an occurrence of applause followed shortly after a shot detect occurrence. This is only one example of the possible icons 8 that can be used to summarize selected features. Additional summary representations are discussed below.

Key playback buttons 9 are also provided for each of the selected features and for the feature summary bar 7. The key playback buttons 9 allow a user to select a feature that is used to control playback functions of the playback control bar 2. For example, if the key playback button 9 for the selected feature "speaker MD" is selected, the play and/or index buttons in the playback control bar 2 could be controlled such that whenever the button is selected, portions of the media file containing the speaker MD are "jumped" to and played back. Other portions of the media file are skipped and not presented to the user. As another example, if the key playback button 9 for the selected feature "applause" is selected, the index buttons in the playback control bar 2 could be controlled such that whenever an index button is selected, a representation of the media file begins immediately before or after occurrences of applause in the media file.

The interface 10 also includes a confidence score value manipulation control 11 that allows a user to adjust confidence score values for corresponding features as desired. As explained more fully below, a confidence score relates to a corresponding feature, is preferably determined using metadata for a corresponding feature, and preferably is used to generate the information displayed in the feature indication windows 6.

Because automatic techniques for generating metadata for media features do not always work reliably, the metadata itself is not always easy to interpret, and the metadata rarely positively indicate the absolute presence or absence of a feature in a media file, automatically derived metadata is preferably mapped to a corresponding confidence score. The confidence score is thus intended to convey to a user, in an understandable form, the probability of a feature's existence in the media file. Preferably, the metadata is mapped to a corresponding time-varying confidence score using some function that is based on prior knowledge about the metadata's reliability. However, mapping of the metadata to a confidence score can be performed in a one-to-one relationship, where individual metadata data values are equal to corresponding confidence score values.

Figure 2:
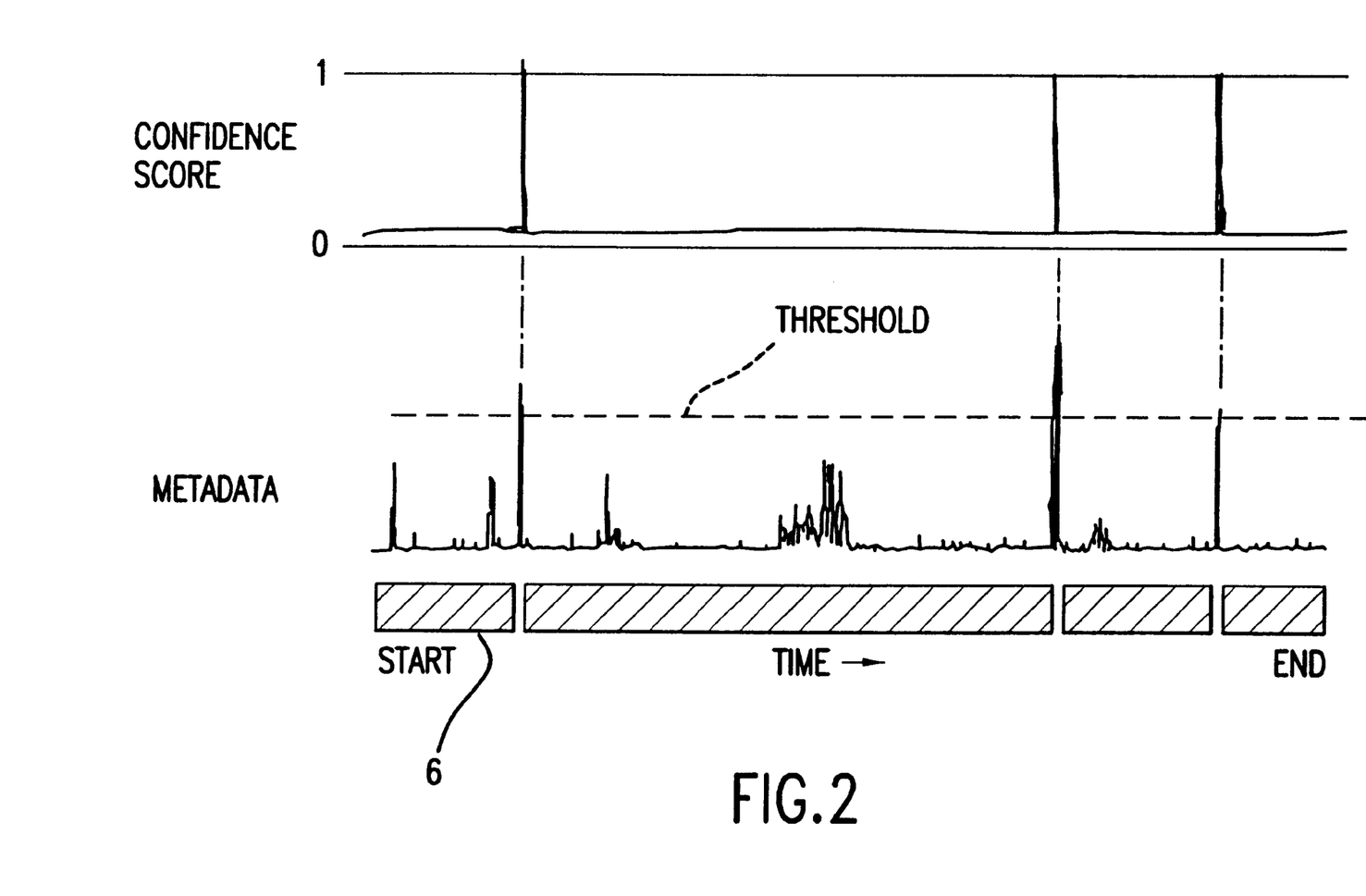
FIG. 2 shows example metadata values, corresponding confidence score information, and an example graphical depiction of corresponding feature information.

FIG. 2 shows an example of shot detect metadata derived from a media file containing video information. The metadata values are represented graphically, and in this example, relatively larger metadata values represent relatively large differences between consecutive video frames at a corresponding time-wise position in the media file.

In the example shown in FIG. 2, metadata representing shot boundary values are mapped to a confidence score using a threshold. If a metadata value is above the threshold, the corresponding confidence score is assigned a value of one, indicating a relatively high probability that a video cut is present in the media file. If the metadata value is below the threshold, the corresponding confidence score is assigned a value of zero. Preferably, the threshold is adjusted automatically or by a user based on the reliability of the metadata. The confidence scores for the shot detection feature can be depicted in a feature indication window 6 of a graphical user interface 10 as shown in FIG. 2. In this example, dark portions of the feature indication window 6 represent a confidence score of zero and light portions of the feature indication window 6 represent confidence score values of one.

As will be understood by those of ordinary skill in the art, the metadata values for a media feature can be mapped to a confidence score in many different ways. As discussed above, the metadata values are preferably mapped to corresponding confidence score values using a function that is determined based on the feature corresponding to the metadata and the reliability of metadata. Linear or non-linear mapping, including normalization, thresholding and filtering, can be performed for numerical metadata. For non-numerical metadata, such as text, closed captions (subtitles), or MIDI streams, metadata can be mapped to confidence score values using statistical or other mathematical methods. For example, the time-wise frequency of a word or set of words in a media data stream could be converted to a set of confidence score values where a relatively high confidence score value is assigned to a portion of the media file that contains relatively more occurrences of the word or set of words, and lower confidence scores are assigned to portions containing fewer occurrences of the word or set of words.

For multi-dimensional data, such as metadata generated by a face recognition algorithm, a lower dimensional confidence score can be computed. In a preferred embodiment, a face recognition algorithm generates five numerical values for each face detected in a video frame: the coordinates of the upper left and lower right corners of the bounding rectangle of the candidate face, and how well the candidate matches the face template. A confidence score for the face is preferably determined according to Equation 1:

$$C = MS(CA/MFA) \tag{1}$$

where C is the confidence score, MS is the value representing how well the candidate matches the face template, CA is the area of the candidate face determined from the upper left and lower right corner coordinates, and MFA is the maximum face area (a constant). In this example, CA is preferably not larger than or constrained to be not larger than MFA.

Mapping metadata values to confidence score values can be performed according to functions that are "learned" using techniques such as learning Bayesian networks. For example, a confidence score mapping system could "learn" that metadata determined for a particular feature is more or less reliable than originally anticipated, and adjust the mapping function, e.g., a mapping threshold, accordingly.

Mapping of metadata values is also preferably controlled based on user control values. For example, a user can adjust a threshold value or other control values using the confidence score value manipulation control 11 in the graphical user interface 10.

Using the example in FIG. 2, adjusting the sliders on the confidence score value manipulation control 11 can adjust the threshold value or values used to map the metadata to confidence scores. By adjusting the threshold value(s), the user can adjust the sensitivity of the mapping function to the metadata and customize the feature information displayed in the feature indicator windows 6. In the FIG. 2 example, only one threshold is used and so only one slider need be displayed on the confidence score value manipulation control 11. However, more than one threshold can be used to map metadata to confidence scores and so an additional slider can be displayed. Further, other graphical controls, such as dials, up/down buttons, numerical indicators, etc., in addition to or in place of the sliders can be used. The confidence score value manipulation control 11 can also be used to adjust mapping control values other than thresholds, such as filter coefficient values, or any other value used to change the way metadata is mapped to confidence score values.

After confidence score values are determined for a feature, the confidence score information is preferably provided to a user as an aid in browsing a media file as discussed above. FIGS. 3–9 show additional examples of how confidence score information can be presented to a user. These examples are not intended to be exhaustive and other methods can be used to provide confidence score information. For example, confidence score information can be conveyed to stimulate human senses other than sight, including sound, touch (e.g., by activating a Braille touchpad) or smell.

The examples shown in FIGS. 3–6 involve a selected feature "speaker MD". This feature represents a speaker depicted and/or recorded in a media file where MD represents the speaker's initials. In this example, metadata related to the speaker's identity can be generated using face recognition techniques, in the case where the speaker is identified "visually" or using speech recognition techniques, where the speaker is identified as having a particular speech pattern, for example. The speaker's identity can also be verified manually by a user. For example, a user can review a media file and enter metadata directly into the system indicating whether a particular speaker is featured in the media file. The user can also enter metadata for other feature types, thereby eliminating a need to have the metadata determined automatically.

Figure 3:
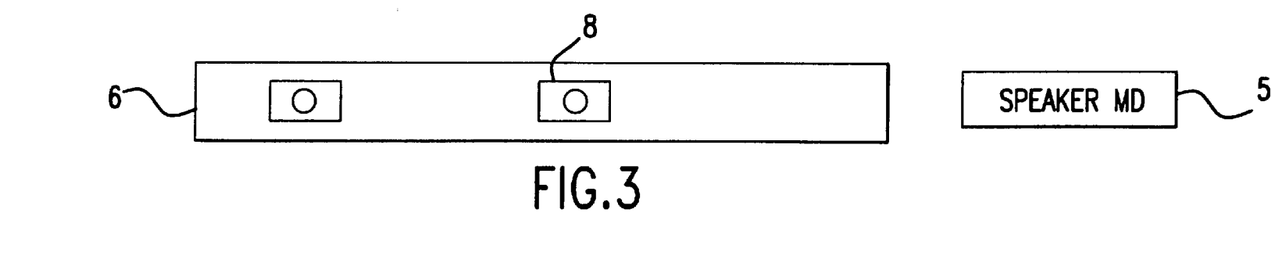
FIGS. 3–9 show different ways of graphically depicting information related to a feature in a media file.

FIG. 3 shows an example feature indication window 6 containing icons 8. The icons 8 represent likely portions in a media file where the speaker MD either talks or is represented visually. In this example, portions where the speaker MD either talks or is represented visually are identified as those portions for which the confidence score exceeds a given threshold. The icons 8 optionally contain a representation of speaker MD's face or is a thumbnail keyframe extracted from the media file at a corresponding point in the media file. Preferably, when a user clicks on an icon 8, a representation of the media file at a point corresponding in time is presented to the user.

Figure 4:
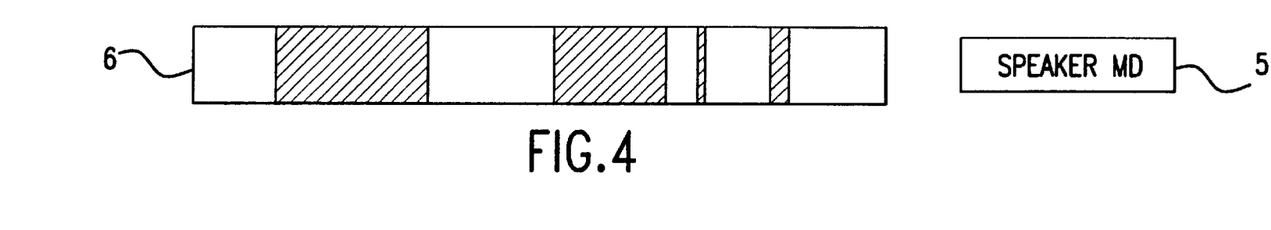

In FIG. 4, portions of the media file that most likely contain the speaker MD are indicated by shaded portions in the feature indication window 6. Optionally, the shaded portions can include color. For example, speaker MD could be assigned the color green, and all green portions displayed in the feature indication window 6 indicate portions of the media file most likely containing the speaker MD. In this example, as in all cases, the display is generated based on the corresponding confidence score, which may not always accurately indicate if the corresponding feature is present in the media file. Instead, as discussed above, the metadata and corresponding confidence score represents a probability or "best guess" regarding whether the feature is present in the media file. This may be true even when a user enters the metadata into the system. For example, a user may not be certain that a particular person is speaking in a media file even though the user is very familiar with the person's voice.

Figure 5:
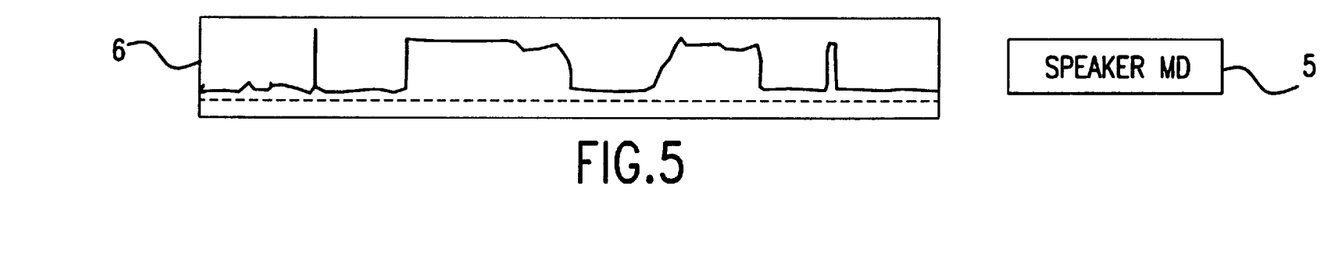

In FIG. 5, the confidence score corresponding to speaker MD, or a normalized version of the confidence score, is displayed in the feature indication window 6. In this type of display, the metadata corresponding to speaker MD can be directly mapped on a one-to-one basis to the confidence score. That is, the metadata values are the same as the corresponding confidence score values. As can be seen in FIG. 5, the confidence score values may not always indicate that the speaker MD is either positively included or not included in the media file. Rather, the confidence score values can vary indicating an uncertainty regarding whether the corresponding feature is present in the media file. This uncertainty may be due to noise in the media data stream, two or more speakers speaking simultaneously, or that a portion of the speaker's face is partially obscured.

Figure 6:
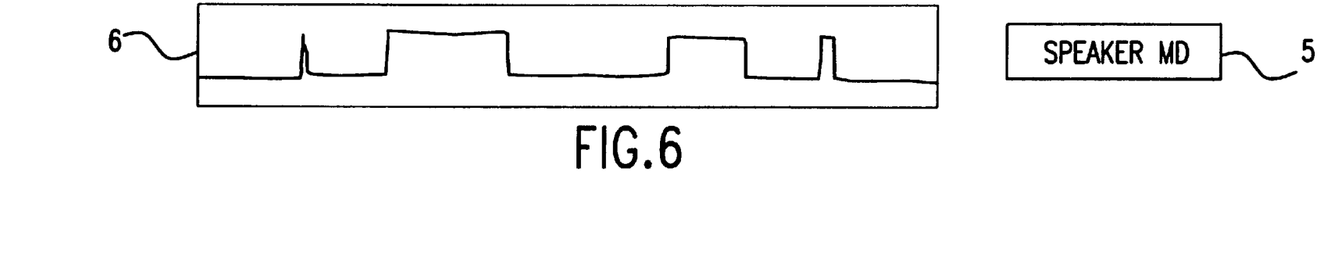

In FIG. 6, the confidence score values shown in FIG. 5 have been thresholded to generate the display in the feature indication window 6. In this example, any confidence score values that fall below the maximum value are clipped to the lowest possible value. As discussed above, a user can vary the threshold values used to process the confidence score values to generate the feature indication using the confidence score value manipulation control 11, or otherwise vary how the feature indication is presented based on the confidence score values.

Figure 7:
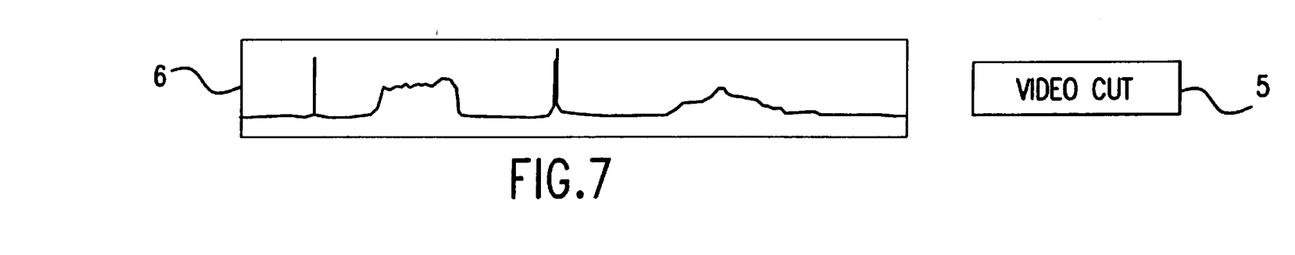
Figure 8:
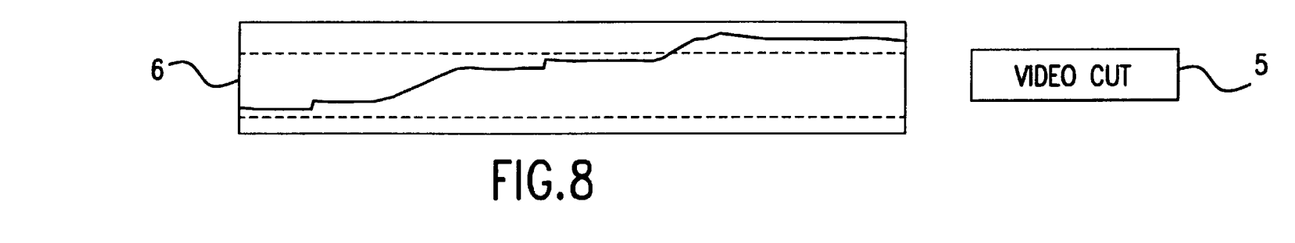
Figure 9:
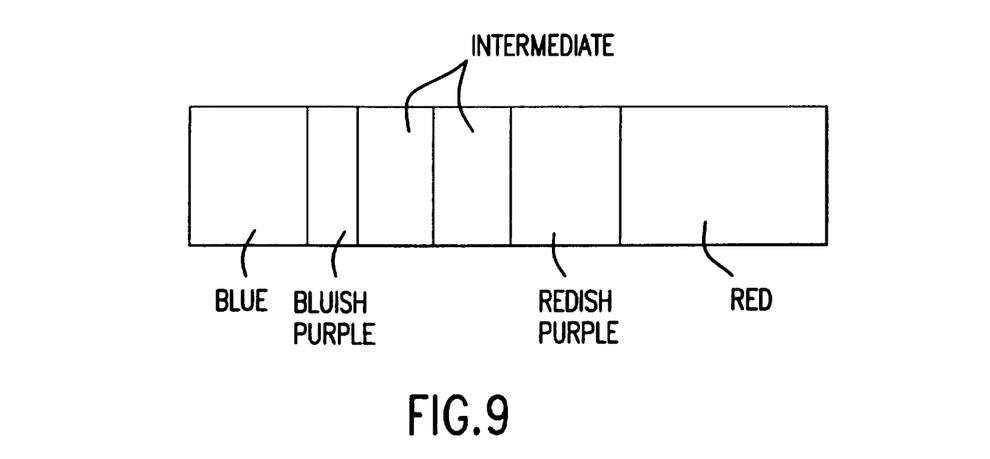

FIGS. 7–9 relate to the display of confidence score information for a video cut feature in a media segment. In FIG. 7, the confidence score values are shown without manipulation in the feature indication window 6. In this case, increasing confidence score values indicate higher probabilities that a video cut has been detected. In FIG. 8, the video cut feature indication shown in the feature indication window 6 is generated based on integrating the confidence score values over time. This type of indication can be useful for determining the total number of video cuts in a media segment or in determining how much the video images change within the media segment. Thus, the change in the integrated value is proportional to the fraction of total accumulated feature change in the media file. Optionally, the curve indicating the integrated value of the confidence score values shown in FIG. 8 can vary in color as the curve represents an increase in value. For example, the curve could start as a blue color for relatively low values and gradually change to a red color for maximum integration values. That is, the curve could start as a blue color and as the curve increases in value, the curve gradually changes through various shades of purple of increasing red content. FIG. 9 shows an alternate representation of the integrated confidence score value where the integrated value is represented only by a corresponding color change in the feature indication window 6 without display of the integration curve itself. In this example, the change in color represents the total accumulated feature change in the media file.

Figure 10:
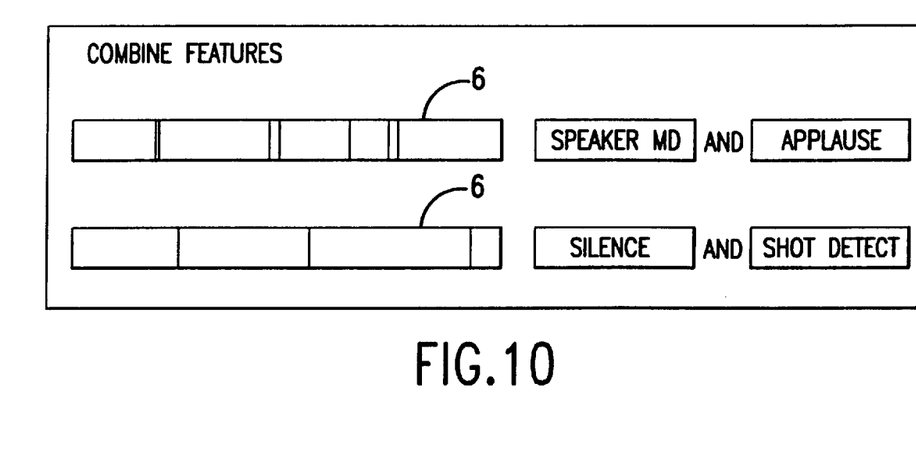
FIG. 10 is an example screen display depicting how features can be combined and corresponding combined feature information can be shown.

The graphical user interface 10 preferably includes an option for combining features and displaying confidence score information based on the feature combination, as shown in FIG. 10. In this example, the features "speaker MD" and "applause" are combined, and the corresponding feature indication window 6 indicates media portions where the speaker MD is depicted during applause. This type of combination can be useful to locate portions in a media file where a particular speaker begins and/or ends a presentation or has made a particularly interesting comment during a presentation.

FIG. 10 shows another combination of the features "silence" and "shot detect". The corresponding feature indication window 6 indicates portions in the media file where a shot detect and silence are simultaneously present. This combination can be useful to indicate the beginning or end of a desired portion in the media file.

As will be appreciated, other feature combinations are possible. For example, a combination of speech detection and motion detection could provide useful information regarding gestures made by a speaker. In addition, more than two features can be combined to generate more sophisticated feature indication information. Preferably, the graphical user interface 10 includes a "Combine" button that a user can click to combine two or more features. However, a user can define which features to combine by other methods.

Figure 11:
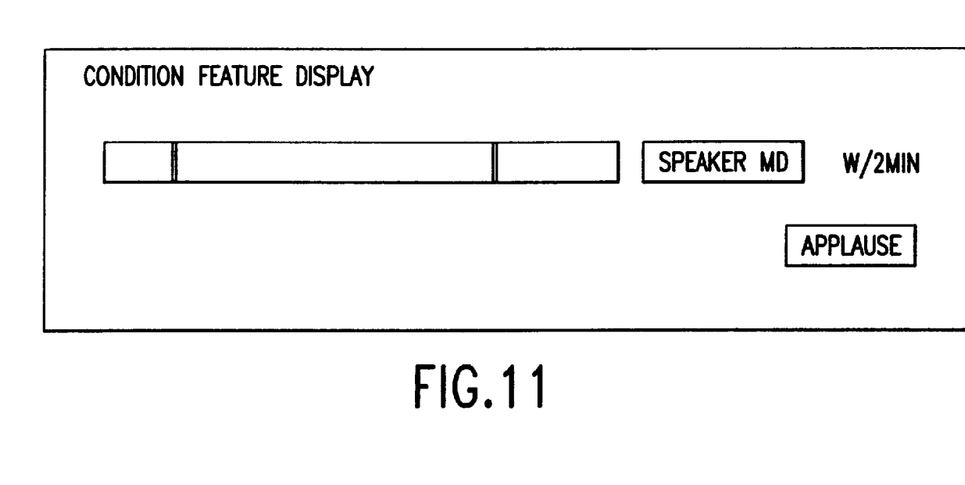
FIG. 11 is an example screen display depicting how display of feature information relating to a corresponding feature can be conditioned on another feature.

As shown in FIG. 11, display of confidence score information can be conditioned on other features. In this example, confidence score information related to the feature "speaker MD" is displayed only when confidence score information indicates a relatively high probability that the speaker MD is shown in a video segment of the media file along with or within two minutes of applause in the soundtrack of the media file. As will be appreciated by those of ordinary skill in the art, other feature combinations or conditions, e.g., Boolean operators, can be used depending on the type of feature indication information needed for a specific task and the relevant features.

Figure 12:
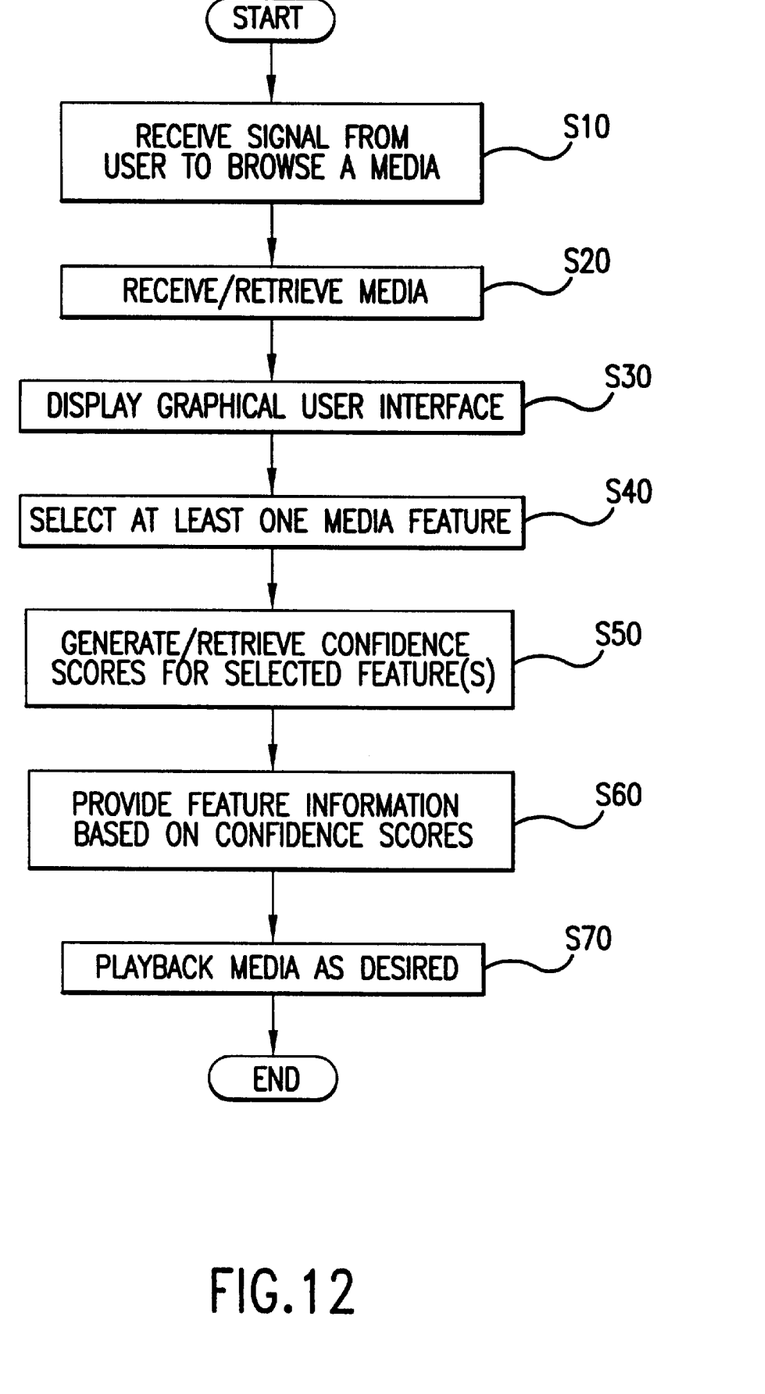
FIG. 12 is a flow chart explaining basic steps of a preferred method for browsing a media file.

FIG. 12 is a flowchart of a preferred method for browsing a media file. In step S10, a user inputs a command indicating a desire to browse a media file. In step S20, the desired media file is retrieved. In step S30, the graphical user interface 10 is preferably displayed to the user, although other interfaces can be used. In step S40, the user preferably selects at least one feature of the media file. In step S50, confidence scores corresponding to the selected features are retrieved and/or generated. Preferably, metadata values for all of the selectable features are precomputed and stored with the media file so that metadata values need not be generated during a browsing session. However, the metadata values and corresponding confidence score values can be generated during a browsing session.

In step S60, feature indications related to the selected features are displayed to the user. In step S70, the user enters commands to play back or otherwise manipulate the media file as desired. For example, a user can click on an icon 8 in a feature indication window 7 and media playback begins from a corresponding position in the media file.

Figure 13:
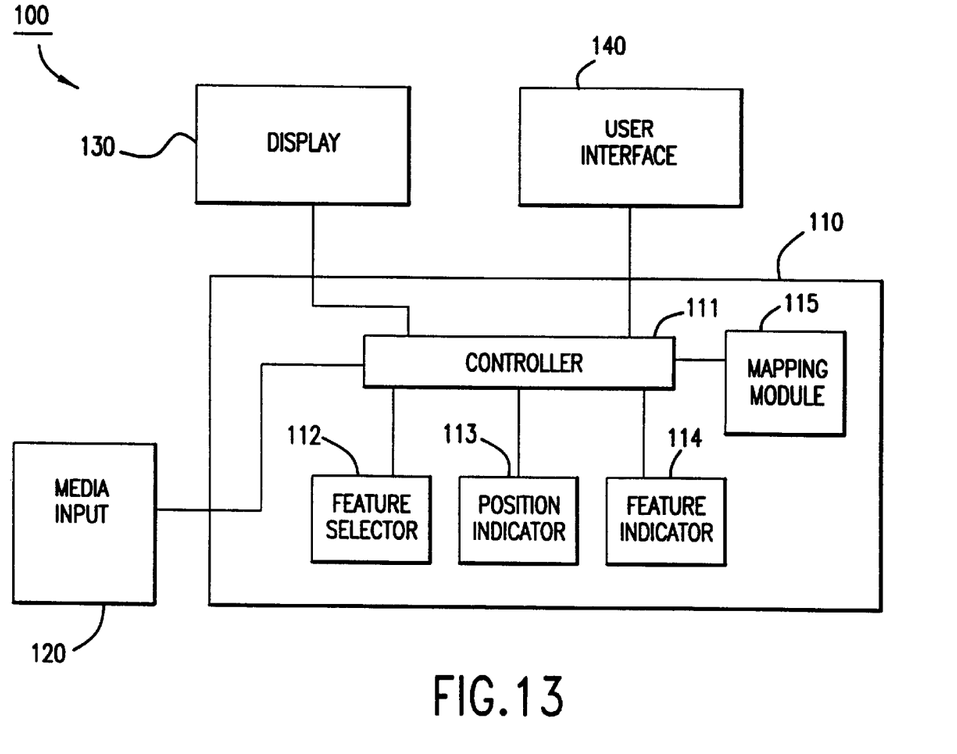
FIG. 13 is a schematic block diagram of a preferred media browser in accordance with invention.

FIG. 13 is a schematic block diagram of a preferred embodiment of a media browser 100 in accordance with the invention. The media browser 100 preferably includes a general purpose computer 110 that has a controller 111. The controller 111 can be implemented as a single special purpose integrated circuit (e.g., ASIC) each having a main or central processor section for overall, system-level control, and separate sections dedicated to performing various different specific computations, functions and other processes under the control of the central processor section. The controller 111 can also be implemented as a single microprocessor circuit or a plurality of separate dedicated or programmable integrated or other electronic circuits or devices, e.g., hardwired electronic or logic circuits such as discrete element circuits or programmable logic devices. The controller 111 and/or the general purpose computer 110 also preferably include other circuitry or components, such as memory devices, relays, mechanical linkages, communications devices, etc., to effect desired control and/or input/output functions.

The general purpose computer 110 also includes a feature selector 112, a position indicator 113, a feature indicator 114 and a mapping module 115, which are all preferably implemented as software modules that include sets of instructions performed by the general purpose computer 110 and/or the controller 111. However, these elements, like the controller 111, can be implemented as an ASIC or an array of ASICs, separate dedicated or programmable integrated or other electronic circuits or other devices.

A media input device 120 preferably inputs a media file in the form of a data stream to the general purpose computer 110. The media input device 120 can include one or more of any of the following devices: a semiconductor memory device, CD-ROM device, magnetic disk drive, other volatile or non-volatile memory devices, communications devices, such as a modem, facsimile transmitter or receiver, local-area or wide-area network devices, telecommunications devices, or other wired or wireless communications devices. In short, the media input device 120 can be any device that transmits a data stream representing a media file to the general purpose computer 110.

The data stream transmitted from the media input device 120 to the general purpose computer 110 can take any of many different forms. For example, the data stream can be analog or digital data that is either compressed or uncompressed, and the data can be provided in parallel or serial form at any desired transmission rate using any desired transmission protocol, if any.

The controller 111 preferably communicates with a display 130, such as a CRT or LCD display. However, the display 130 is not limited to these types of displays. In short, the display 130 can include any device capable of presenting a representation of a media file to a user, including an audio speaker, visual display device, touch display (such as a Braille device), etc.

The media browser 100 also preferably includes a user interface 140, such as a keyboard and/or computer mouse, that permits a user to communicate with the controller 111. Other devices can be used with the user interface 140, including touch screen devices, light pens, voice activated and/or voice recognition systems, etc.

Where the invention is used over a more distributed system, such as the Internet, the user interface 140 may include a general purpose computer and appropriate communications devices to send and receive signals to a more remotely located general purpose computer 110, i.e., a remote server. In this case, the general purpose computer 110 can send display control signals to the user interface 140, which directly controls the display 130. In addition, the user interface 140 can perform some or all of the functions performed by the general purpose computer 110, and some or all of the modules, such as the position indicator 113, mapping module 115, etc., can operate, at least in part, within the user interface 140. The media input 120 can be physically located near the general purpose computer 110, the user interface 140 (e.g., a CD-ROM drive), or at some other location. Alternately, the media input 120 can be formed of a multitude of media sources, such as magnetic hard drives distributed over a wide network. All that is required is that the media stored in the media input 120 be accessible to the media browser 100. In a preferred mode of operation, the media browser 100 receives a command from a user via the user interface 140 indicating a desire to browse a media file. The desired media file is then either transmitted from the media input device 120 to the general purpose computer 110 or the media file is retrieved from a memory device provided as part of the controller 111, for example. The controller 111 preferably sends a signal to the display 130 to display the graphical user interface 10 to the user. Preferably, included in the signal provided to the display 130 is a command to indicate a current position of the media file is the beginning of the media file. That is, the thumb 31 on the timeline 3 is displayed at the far left position. Of course, the thumb 31 need not be displayed, or can be displayed at any desired position along the timeline 3. Likewise, a video frame, if present, is displayed in the video display portion 1 corresponding to a current position in the media file. The signal provided by the controller 111 to the display 130 regarding the position of the thumb 31 is based on a signal provided by the position indicator 113, which keeps track of a current position in the media file.

After viewing the graphical user interface 10, the user preferably selects at least one feature of the media file using the media feature selection 4 and the user interface 140. Feature selection indications are provided to the feature selector 112, which stores the selected features and provides a signal to the controller 111 to display the selected features in a selected feature window 5 of the interface 10. The feature selector 112 also provides an indication to the controller 111 if a selected feature is not selectable. For example, if a user selects a feature that is not present in a media file, e.g., a user selects the shot detect feature for a media file that does not contain video information, an indication that the selected feature is not selectable is provided to the user. Preferably, the feature selector 112 provides a list of selectable features to the controller 111 so that only selectable features are displayed in the media feature selection 4.

Once media features are selected, the mapping module 115 generates and/or retrieves confidence scores corresponding to the selected features. Preferably, metadata values for all of the selectable features are precomputed and stored with the media file so that metadata values need not be generated during a browsing session. However, the mapping module 115 can automatically generate metadata values and map the metadata values to corresponding confidence score values "on the fly."

Next, the feature indicator 114 generates and provides information to the controller 111 to display feature indications related to the selected features.

Based on the displayed feature indications, a user can select a portion of the media file for review, or perform other actions, such as zooming the timeline 3, moving the timeline thumb 31, etc. When the user makes a decision to review a portion of the media file, a user can input signals to the media browser 100 to playback or otherwise manipulate the media file. For example, the user can click on an icon 8 in a feature indication window 7 and the controller 111 controls the display 130 to provide a representation of the media file starting from a time-wise position in the media file consistent with the selected icon 8.

Figure 14:
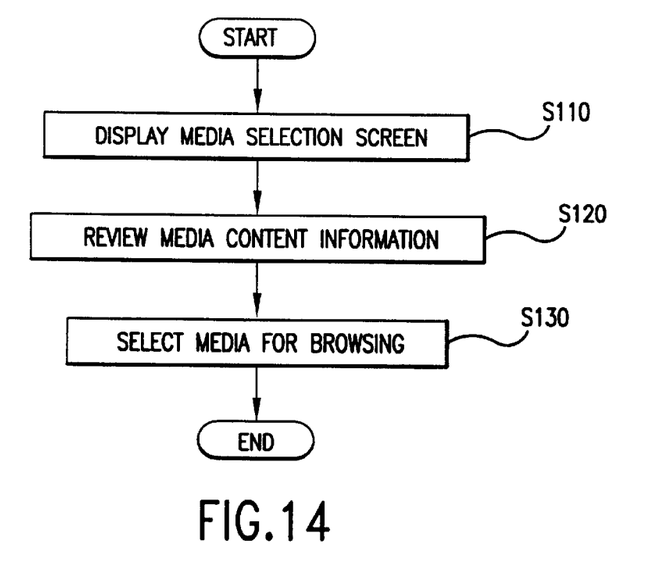
FIG. 14 is a flow chart of steps of a preferred method for selecting a media file to be browsed.

FIG. 14 is a flowchart that describes in further detail how a user chooses a media file for browsing and provides a corresponding signal to the media browser 100. In step S110, the controller 111 sends a signal to the display 130 to display a media selection screen. Preferably, the displayed selection screen includes at least the display shown in FIG. 15. The selection screen preferably includes several rows 200, each row 200 displaying information for a corresponding media file. Each row 200 preferably includes such information as a keyframe 201, a timeline 202, a media file name 203, identifying information, such as a date, 204, and a keyword listing 205. The keyframe 201 is preferably selected from a particularly relevant portion of the media file or otherwise visually conveys information related to the overall content of the media file. The timeline 202 is similar to the timeline 3 in the graphical user interface 10. The timeline 202 preferably displays information related to a selected media feature, e.g., shot boundaries. Preferably, a user can view keyframes or other video information when a cursor 206 is moved over the timeline 202. For example, when a user moves the cursor 206, a keyframe in the media file that is nearest in time to the cursor 206 position is displayed to the user. Keyframes are represented on the timeline 202 by a small icon that preferably changes appearance when the icon is nearest the cursor 206. Keyframes can be automatically selected based on confidence score information or can be previously identified by an operator. Alternately, the media browser 100 could display a predefined summary video sequence or another shortened representation that provides a user additional information to make a selection decision. The timeline 202 can also provide other information related to media features in any of the ways described above. For example, icons, color sequences or keyframes could be displayed on the timeline 202 to provide media feature information. The media feature information can be displayed based on metadata and confidence score information or based on predefined summary information provided by a user.

Figure 15:
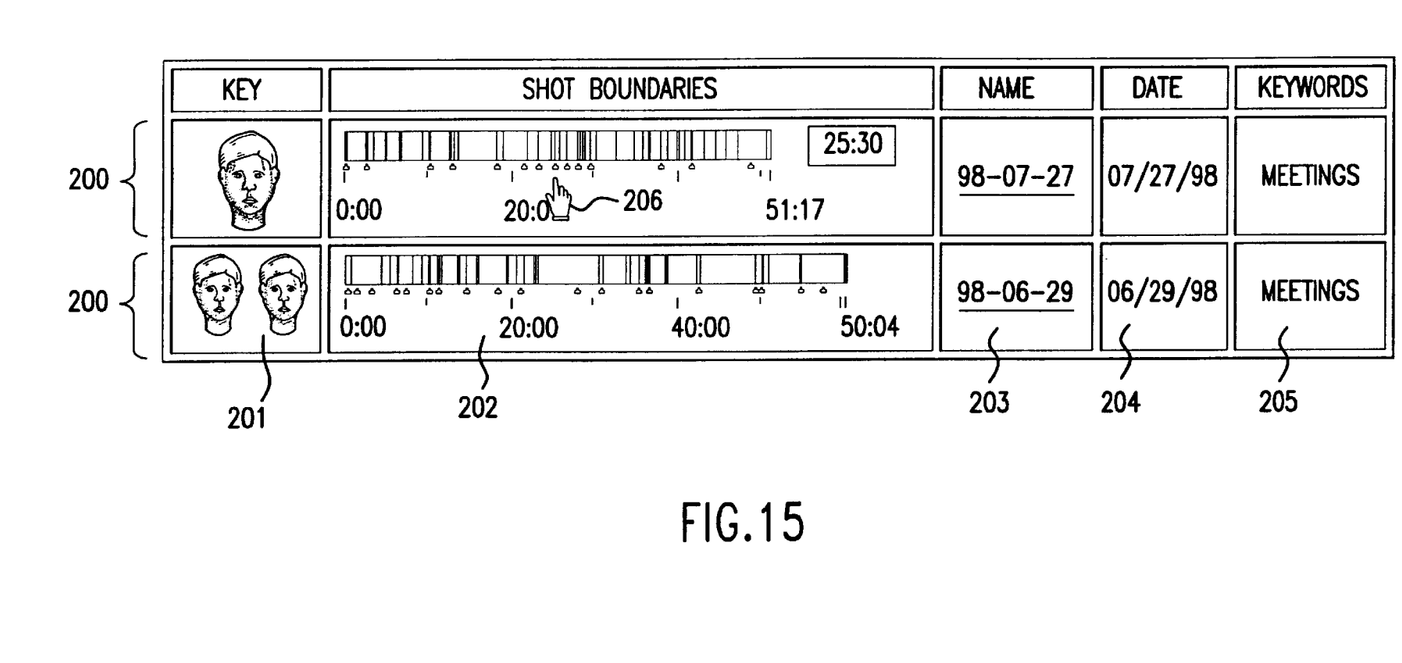
FIG. 15 is a preferred media selection screen.

Preferably, a user can search a database of media files by the name 203, identifying information 204 and/or keywords 205 to narrow an initial search and generate an initial display of media file rows 200 on the selection screen. Preferably, the user can search using any known search screen, such as those associated with electronic database applications or Internet browser/search engines. In fact, the media browser 100 can be very useful in browsing media files posted on a large network, such as the Internet, since the media browser 100 allows a user to rapidly and accurately identify and experience desired portions in media file. To speed review and selection, the media displayed on the initial selection screen are preferably sorted, placing those media files most relevant to the search at the top. Sorting can be done based on confidence score information, search results (e.g., number of hits in a media file), or other desired criteria.

In step S120, the user reviews the media files, either by viewing keyframes, keywords, selected portions of the media files using the timeline 202 features, or by reviewing the media files in any of the ways discussed above. In step S130, the user selects one or more of the media files for browsing. Preferably, the user selects a media file by clicking on an associated keyframe 201, but the user can select media files in other ways, such as by entering a media file name or other identifier by keyboard.

Figure 16:
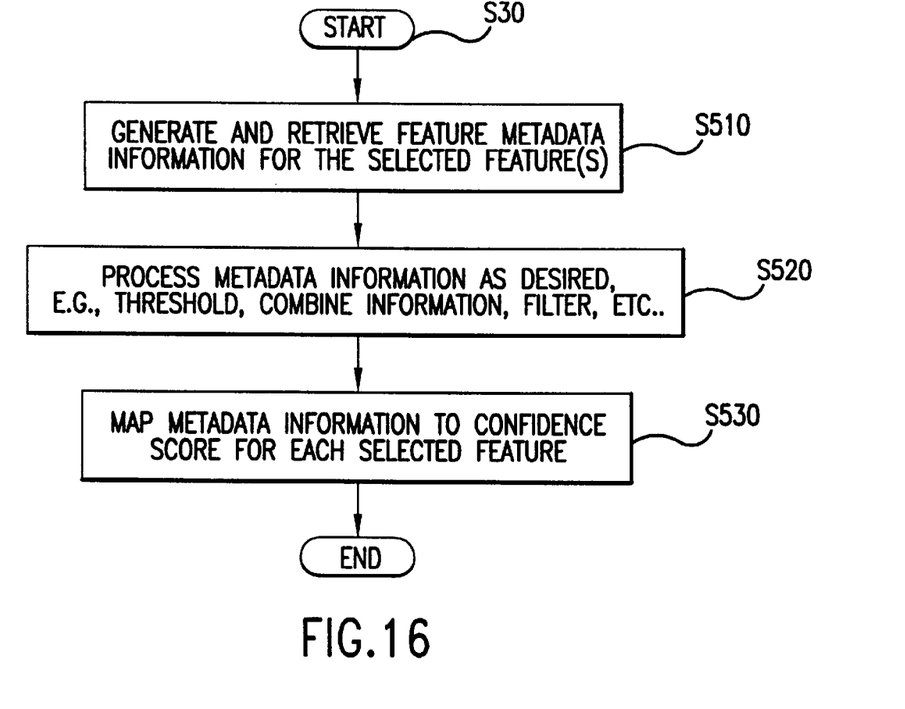
FIG. 16 is a flow chart of steps of a preferred method for mapping feature metadata to a corresponding confidence score.

FIG. 16 is a flowchart that describes in further detail how the mapping module 115 generates and/or retrieves confidence scores. In step S510, the mapping module 115 generates and/or retrieves metadata information for the selected features. As described above, the metadata information is preferably precomputed and stored along with the media file. However, if metadata for a selected feature is not stored with the media file, the mapping module 115 can apply any of the above described automatic techniques to the media file to generate metadata information. In addition, the mapping module 115 can receive manually input metadata information from a user.

In step S520, the mapping module 115 optionally processes the metadata information as desired in preparation for mapping the metadata to confidence scores. For example, the mapping module 115 thresholds, combines, filters or otherwise processes the metadata information in preparation for mapping the metadata information to confidence scores.

In step S530, the mapping module maps the processed metadata information to confidence score values for each selected feature using a desired function, e.g., a one-to-one mapping, other linear or non-linear functions, etc.

Figure 17:
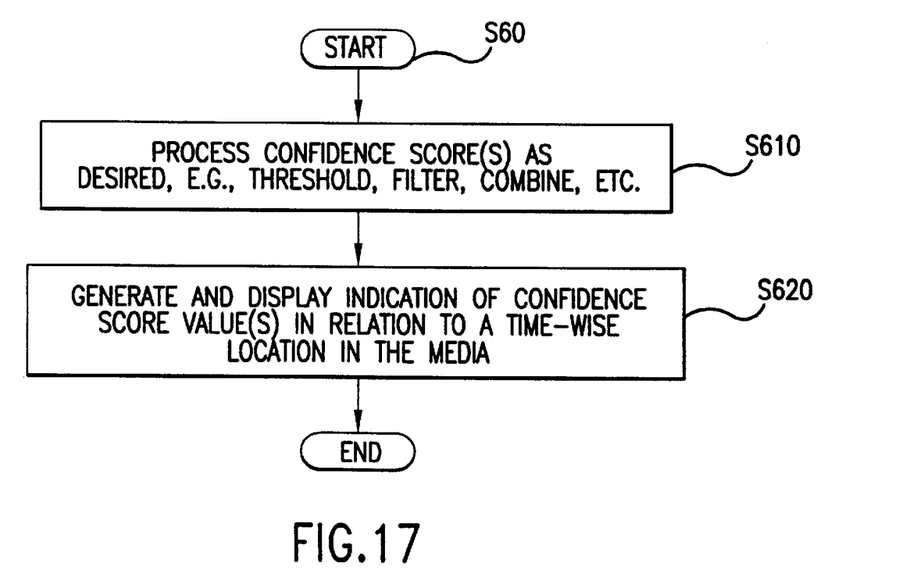
FIG. 17 is a flow chart of steps of a preferred method for processing confidence scores and providing information related to the confidence scores.

FIG. 17 is a flowchart describing in further detail how the feature indicator 114 provides feature information for the selected features. In step S610, the feature indicator 114 processes the confidence scores for each selected feature as desired. For example, the feature indicator 114 thresholds, filters, combines, etc., the confidence score values as discussed above in preparation for providing feature information.

In step S620, the feature indicator 114 generates information to display feature indications for each of the selected features based on the processed confidence scores.

For example, the feature indicator 114 generates signals to display feature indications in a feature indication window 6.

Figure 18:
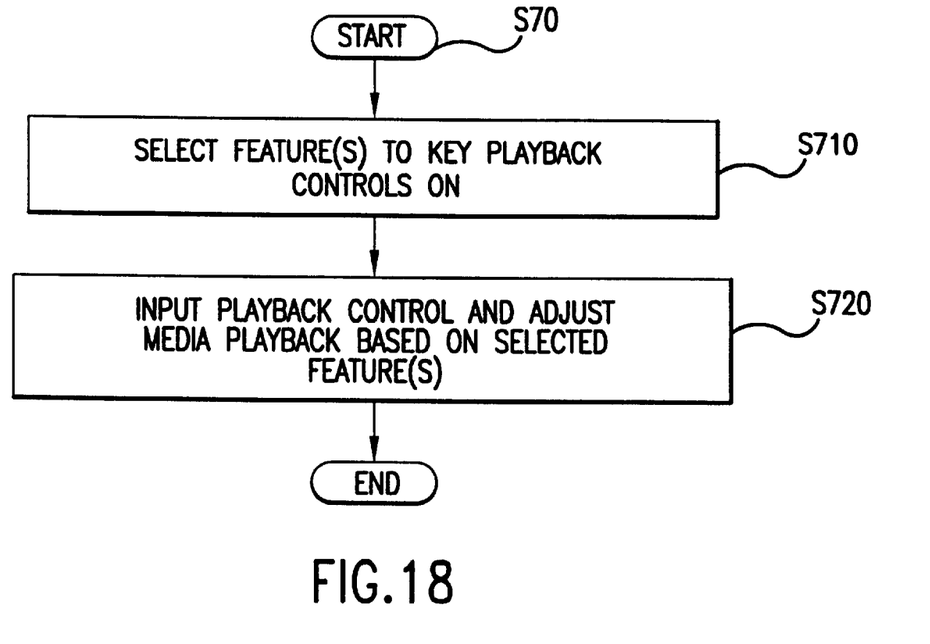
FIG. 18 is a flow chart of steps of a preferred method for controlling playback functions based on a selected feature.

FIG. 18 is a flowchart describing in further detail how the controller 111 controls media playback as desired. In step S710, a user optionally selects features using the key playback buttons 9 on the graphical user interface 10. For example, the user could select the "speaker MD" feature. In step S720, the controller 111 inputs a playback control signal received from a user and adjusts the media playback based on the features selected in step S710. For example, the user could select the play button, and the media browser 100 adjusts the replay of the media file based on the "speaker MD" feature. As one example, the media browser 100 could adjust the playback speed according to Equation 2:

$$R=C+M(1-C) \qquad (2)$$

where R is the playback rate, C is the confidence score for the speaker MD feature, and M is a maximum playback rate, which is preferably set by a user. In this example, the confidence score C varies between 0 and 1. Therefore, as the confidence score increases (indicating that the speaker MD is speaking or is depicted in the media file), the playback rate approaches the value C. In contrast, as the confidence score decreases (indicating that the speaker MD is not featured in the media file), the playback rate approaches the maximum playback rate M, thereby speeding replay in sections where the speaker MD is not present in the media file.

This is only one example of how the media browser 100 can control the media playback controls based on a selected feature. The media browser 100 can also control the stop button to stop playback at a point in the media file where a feature is no longer present (e.g., a speaker leaves the room) or where a feature next occurs (e.g., stop at the next shot boundary). As discussed above, the index controls can be controlled to jump to a point in the media file where a feature is present in or absent from the media file. Further, the timeline thumb 31 can be controlled based on a selected feature. For example, the thumb 31 could change its appearance, e.g., color, when the thumb 31 is moved over a media file portion where a selected feature is present, or the thumb 31 could be "indexed" so that a user can only move the thumb 31 within portions of the media file where a selected feature is present or absent. Preferably, control of the playback controls, including the thumb 31, is based on the confidence score value for a selected feature. Determination of whether a feature is present or not in a media file is preferably based on the confidence score value, e.g., if the confidence score exceeds/is below a desired threshold the media browser 100 determines that the feature is present in/absent from the media file.

Figure 19:
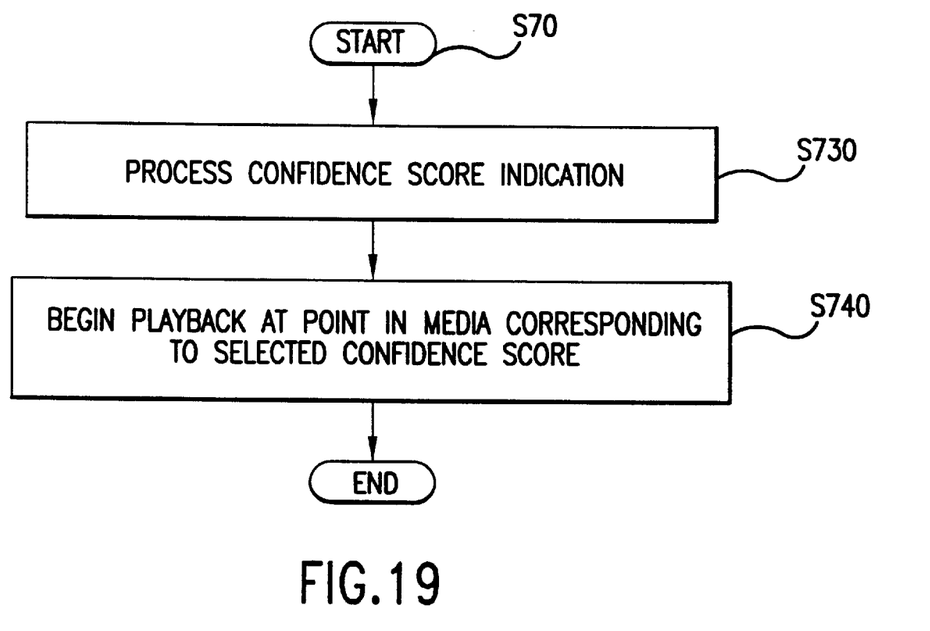
FIG. 19 is a flow chart of steps of a preferred method for reviewing a media file based on selection of a confidence score indication.

FIG. 19 is a flowchart describing in further detail another way how the controller 111 optionally controls media playback. In step S730, a user selects a confidence score indication in a feature indication window 6. For example, a user can select (e.g., double click) an icon 8 displayed in a feature indication window 6. In step S740, the controller 111 accesses the media file and controls the display 130 to begin playback at a point in the media file corresponding to the selected confidence score indication. Playback can be of selected portions of the media file of particular interest determined based on confidence score values.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention as set forth herein.

What is claimed is:

1. A media browser, comprising:
    a feature selection module that inputs at least one media feature selected by a user;
    a media presentation device that provides an aural and/or visual representation of a media file being browsed; and
    a feature indicator that provides information related to a confidence score for at least one selected media feature, the confidence score being related to a presence of a corresponding selected media feature in the media file;
    a confidence score mapping module that maps a metadata value representing a time-wise evaluation of a media feature in the media file to a corresponding confidence score,
    wherein the selected media feature is not used to perform, and is not related to, a text search of the media file.

2. The media browser of claim 1, wherein the confidence score mapping module performs a non-linear mapping of the metadata value to the confidence score.

3. The media browser of claim 1, wherein mapping of the metadata value to the confidence score is adjusted based on a user-defined control value.

4. The media browser of claim 1, wherein the metadata value is automatically determined.

5. The media browser of claim 1, wherein the metadata value is input by a user.

6. The media browser of claim 1, wherein the feature indicator provides information related to the confidence score based on a value of another confidence score.

7. The media browser of claim 1, wherein the feature indicator combines at least two selected confidence scores and provides information related to the combined confidence scores.

8. The media browser of claim 1, wherein the media presentation device comprises user controls that control presentation of the aural and/or visual representation of the media file, and an effect of the user controls on the presentation is adjusted based on at least one confidence score.

9. A method of browsing a media file, comprising:

selecting a feature of a media file being browsed, the feature not being used to perform and not related to a text search of the media file;

providing information related to a confidence score for at least one selected feature relative to a segment of the media file, the confidence score related to the existence of a corresponding selected feature in the media file;

mapping metadata representing a time-wise evaluation of a feature in the media file to a corresponding confidence score; and selecting a portion of the media file based on the information related to a confidence score for at least one selected feature.

10. The method of claim 9, wherein the mapping is a non-linear mapping.

11. The method of claim 9, further comprising adjusting the mapping based on a user-defined control value.

12. The method of claim 9, further comprising the step of automatically determining the metadata.

13. The method of claim 9, further comprising the step of receiving metadata input by a user.

14. The method of claim 9, wherein the step of providing information further comprises providing information related to a confidence score based on a value of another confidence score.

15. The method of claim 9, further comprising the steps of: combining at least two selected confidence scores; and providing information related to the combined confidence scores.

16. The method of claim 14, further comprising the steps of inputting a user control value for controlling a presentation of an aural and/or visual representation of the media file; and adjusting the effect of the user controls based on at least one confidence score.

* * * * *